United States Patent Office 3,227,984
Patented Jan. 4, 1966

3,227,984
LEVEL SWITCH DEPOLARIZER
Kenneth C. Halliday, Jr., Port Washington, N.Y., assignor to The Bendix Corporation, Teterboro, N.J., a corporation of Delaware
No Drawing. Filed Apr. 1, 1963, Ser. No. 269,777
19 Claims. (Cl. 338—44)

The invention relates generally to improvements in electrolytic liquid level switches and in particular to a means for depolarizing or absorbing electrolytic hydrogen which may be generated in such switches.

Liquid level switches are well known. Generally they comprise a closed receptacle containing a liquid electrolyte, and electrodes having a surface adapted to contact said electrolyte to provide a current conducting path between the electrodes through the electrolyte. An air bubble within said receptacle shifts about upon tilting of the switch to expose more or less of the electrode's surface or surfaces whereby the opening and closing of electrical circuits is controlled. The present invention is not concerned with any specific construction of liquid level switches. Examples of switch construction are shown in Cid, U.S. Patents 2,890,430 and 2,852,645 entitled respectively Liquid Level Current Control Device and Switch, both assigned to the same assignee as the present application. Reference is also made to Rosenberg U.S. Patent 2,977,559, entitled Low Resistance Electrolyte Tilt Switch, which is also assigned to the same assignee as the present application.

As noted above, liquid level switches contain a liquid electrolyte (i.e. liquid phase component) and a gas bubble (gas phase component). It is desirable that both phases remain near their predetermined physical equilibrium; i.e., that the volume ratio of liquid to gas remain reasonably constant, and that no additional phases whether liquid or solid shall appear in the switch. However, the necessary electrical function of switches introduces a problem of maintaining chemical equilibria; more particularly in the occurrence of the phenomenon known as polarization, or in a practical sense the release of some electrolytic hydrogen. Polarization in electrolytic systems (see a theoretical discussion in Neil K. Adam, The Physics and Chemistry of Surfaces, London, Oxford University Press (1941), pp. 321–336) is a complex phenomenon in which electrolyte composition, electrode material, and various electrical parameters influence the rate of production and the amount of hydrogen that may appear in the system.

For the particular case of electrolytic switches, which are essentially closed systems with regard to material balance, occurrence of hydrogen can massively (22.4 liters per mole) increase the gas phase; which, since the receptacle imposes isochoral conditions; produces a change in the internal pressure of the switch. If the pressure is not properly controlled, the switch may not function satisfactorily, and, in extreme cases, the pressure will be sufficient to burst the switch container. The problem of the release of hydrogen in electrolytic switches has been recognized, cf. Polye U.S. Patent application Ser. No. 5,168 entitled Improved Electrolyte for a Sealed Liquid Level Current Control Device, assigned to the same assignee as the present invention.

An object of the present invention is to provide in a liquid level switch a substance that will maintain the gas phase in a predetermined equilibrium range with the liquid phase, and this object is achieved by chemical methods described herein.

According to the present invention, there is included in the liquid component a liquid phase halogen organic complex and more particularly one containing chlorine, bromine, or iodine. The organic complex exchanges or replaces its halogen for the hydrogen. Thus, the hydrogen becomes part of a new liquid phase molecule, and the freed halogen is suitably soluable in the residual organic liquid components resulting in no change in the gas phase. This type of reaction is sometimes referred to as hydrogenolysis or a hydrogenolysis reaction.

Thus it becomes possible to depolarize and chemically combine the electrolytic hydrogen by introducing into the level switch solution, a small percentage of one of the halogens-containing substances described hereafter. This chemical must be of appropriate phase condition, i.e. a miscible liquid in the same temperature range as the electrolyte, and the product of the reduction (hydrogenolysis) should likewise remain compatible with the electrolyte.

Appropriate chemicals are found among the alkyl halides, alkylene halides, alkylyne halides, acyl halides, and related halogen solution complexes. These may be simply illustrated by conventional formulas of the following types:
where R can be, for example, Alkyl ($C_nH_{2n+1}$)
Alkylene ($C_nH_{2n-1}$)
Alkylyne ($C_nH_{2n-3}$)
Acyl ($C_nH_{2n+1}O$)

and X can be iodine, bromine, or chlorine, and some iodine solution complexes not sharply characterized but structurally relates to the foregoing types.

Functionally, the hydrogenolysis reaction is $$R-X+H=R'+X$$

where R and X are the same as above,
H is hydrogen, and
R' is a dehalogenated hydrocarbon, derived from the parent substances, e.g.

$$C_nH_{2n+1} I+H=C_nH_{2n+1}+I \text{ (free)}$$

Further, from the extensive class of theoretical halogen organic compounds defined above, we limit ourselves to a practical subclass, i.e. those with a carbon skeleton of not less than three carbon atoms nor more than 10 carbon atoms and to compounds inclusive of iodine, bromine, and chlorine, but accepting fluorine as appropriate halogen members.

The lower members, i.e. methyl and ethyl halide are not suitable as depolarizers because they exist in gas phase in the temperature environment of operation in electrolytic switches. Those halogen organic compounds with more than 10 carbons are likewise unsuitable due to having as standard state a solid phase.

We therefore list those halogen organic compounds established as useful by their physical states and their ability to act as depolarizers within the scope of these inventions.

The following examples of specific depolarizer combinations are illustrative of the invention.

Example 1.—Using 4.5% by volume of the depolarizer 1-iodo-hexane with an electrolyte consisting of ¼ molar sodium iodide in a carrier solvent including 15 grams iodine in 1/10 liter propyl-propionate.

Example 2.—Using 4% by volume of the depolarizer 2-iodo-octane with an electrolyte consisting of ¼ molar potassium iodide dissolved in a bi-solvent carrier of 12 grams iodine in 100 ml. di-isopropyl-ketone.

Example 3.—Using 4% by volume of the depolarizer 1-iodo-heptane with an electrolyte consisting of ½ molar sodium iodide dissolved in bi-solvent carrier of 100 grams iodine per 1 liter anhydrous n-propanol.

In these three examples, the iodine atom is on the 1st, 2nd, and 1st carbon respectively. The iodine atom may be placed on any one of the carbon atoms in the chain.

For example, in example 1, 2-iodo-hexanes or 3-iodo-hexanes, etc. would be equivalent.

The three examples cite halogenated (iodine) hydrocarbons with an alkyl group having respectively 6, 8, and 7 carbons in each chain. These chemicals initially and after hydrogenolysis will maintain a liquid phase over the operating temperature range to which the switch is designed, for example, −55° to +125° C. Chemicals may be used with longer or shorter carbon chains so long as they maintain a liquid phase within the temperature range to which the switch solution is submitted. It has been found that the alkyl halides of not less than 3 nor more than 10 carbons are most suitable.

With regard to pressure, it should be noted that pressure is a parameter which influences the liquid phase of the chemicals. The switch is a sealed receptacle which may have a built-in tolerance for pressure. For example, a switch constructed in accordance with the teachings of the above cited Cid patent of FIGURES 4 and 5 therein will withstand 80–100 atmospheres of pressure. In Example 1, the iodo-hexane after hydrogenolysis forms hexane which has a boiling point, at one atmosphere, of +69° C., a temperature well below the higher temperature limit (+125° C.) of the switch. But, the hexane in the switch is maintained in a liquid phase above its boiling point, because as the temperature rises, vapor is generated, and since the liquid is substantially incompressible, the generated vapor raising the internal pressure of the switch and in turn, raises the boiling point of the liquid. Thus, the system is self-regulating; and although the internal pressure varies, the gas and liquid phases are maintained in a substantial equilibrium. As the temperature decreases, the generated vapor returns to liquid phase reducing the internal pressure and the boiling point.

Under certain circumstances, it may be advisable to initially put other than atmosphere of pressure in the switch as this will keep members of the lower alkyl groups in solution, e.g. butane and propane. For low pressure switches and different temperature ranges, other length carbon chains may, or may not, be used as debated by the particular operable temperature ranges and/or internal pressure capabilities of the switch. With regard to particular length chains, the chemist applying this invention is referred to the well known three phase (solid, liquid, and gas) relationship vs. temperature and pressure, reference being made to standard textbooks, such as Tamman, Gustav, Aggregatzustande, Die Zustandsanderungen Der Materie in Abhangigkeit Von Druck Und Temperatur, Leipzig (1923); Maxwell, J. B., Data Book on Hydrocarbons, New York, Van Nostrand (1950) and Sage, Bruce H. and Lacey, William H., Volumetric And Phase Behavior of Hydrocarbons, Stanford University Press (1939). In summary, one of the requirements limiting the length of hydrogen chain is that it maintain liquid phase.

Increased amounts of depolarizer will increase the life of the switch, in that more depolarizer is available to absorb hydrogen, but the quantity of depolarizer in the solution is also determined by (1) its miscibility in the electrolyte and (2) its conductivity. Thus, for example, in Example 1, 1-iodo-hexane being both a poor conductor and not extremely soluable in the electrolyte, its percentage is limited in the range not exceeding 5 percent. With greater concentrations of iodo-hexane, two liquid phases will appear with the depolarizer on the bottom and the electrolyte on the top. Thus additional quantities of depolarizer are not in contact with the gas hydrogen and do not contribute to the depolarization action.

The reactions may be appropriately activated by suitable catalysts such as palladium or platinum in the above examples and in the examples which follow.

*Example 4.*—Using 2% by volume of depolarizer 1-2-3-tri-iodo-propane, the electrolyte to consist of ¼ molar sodium iodide dissolved in a bi-solvent carrier of 150 grams of iodine per liter of propyl-propionate.

In Example 4, the depolarizer has three iodine atoms available to be replaced by hydrogen ions and thereby has three times the hydrogen depolarizing power of a hydrocarbon with a single iodine atom.

*Example 5.*—Using 5% by volume of the mixed depolarizers tetra-iodo-propanol (CHI$_2$CI$_2$CH$_2$OH) and tetra-iodo-propyl-iodide (CHI$_2$CI$_2$CH$_2$I) with an electrolyte consisting of ⅓ molar sodium iodide in a carrier solvent of 20 grams iodine dissolved in 65 ml. propyl-propionate 35 ml. propanol.

*Example 6.*—Using 8% by volume of the depolarizer 2-3 di-iodo-propanol with an electrolyte consisting of ¼ mole potassium iodide dissolved in aqueous (5%) methanol.

*Example 7.*—Using .6 gram potassium bromide in 100 cc. methanol as carrier solvent electrolyte, the depolarizer to consist of 4% by volume 2-3-di-bromo-1-propanol.

*Example 8.*—Using 4% by volume of the depolarizer di-tetra-iodo-propyl-ether

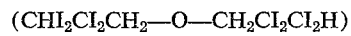

(CHI$_2$CI$_2$CH$_2$—O—CH$_2$CI$_2$CI$_2$H)

with an electrolyte consisting of ¼ molar sodium iodide in a carrier solvent of 15 grams iodine in ⅒ liter n-propanol.

*Example 9.*—Using 8% by volume of the depolarizer tetra-iodo-propyl-butyl-ether with an electrolyte consisting of ¼ molar sodium iodide in a carrier solvent of 15 grams iodine in ⅒ liter n-propanol.

*Example 10.*—Using 10% by volume proponyl chloride

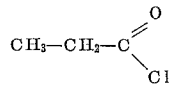

as depolarizer with an electrolyte consisting of ¼ molar sodium chloride in propylene glycol.

For best results, the solution of Example 10 should be used in a switch having carbon electrodes because the released chloride after exchange with the hydrogen further reacts with free hydrogen forming acid. The carbon electron will less readily react with the acid.

Bromine may be substituted for the chlorine in Example 10, also, iodine may be substituted. The switch will be more sensitive to force fields when the heavier members of the halogen family are utilized.

*Example 11.*—Using 8% by volume of n-butyryl chloride as depolarizer in the electrolyte consisting of ¼ molar potassium chloride in n-butanol.

*Example 12.*—Using 5% by volume of the depolarizer 3-iodo-pentane with an electrolyte consisting of ½ mole sodium iodide dissolved in absolute methanol.

*Example 13.*—Using 4% by volume of depolarizer solution of 1-2-3-tri-iodo-propane with an electrolyte consisting of ½ mole sodium iodide dissolved in azeotropic aqueous ethanol.

The invention is not limited to the examples given as the electrolytes may be varied within wide limits and any particular depolarizer may be used with a variety of electrolytes. Various changes of the components will now be apparent to those skilled in the art and may be made without departing from the scope of the invention. Reference is, therefore, to be had to the appended claims for a definition of the limits of the invention.

What is claimed is:

1. In a liquid level current control device of a type including a closed receptacle containing a modified halogen electrolyte and electrodes having a surface adapted to contact said electrolyte to provide a current conducting path in said electrolyte between said electrodes; the improvement wherein said electrolyte includes a halogenated organic complex having at least one member of a group consisting of iodine, bromine, and chlorine, the amount of halogenated organic compound being sufficient to combine by hydrogenolysis with a substantial percentage of the hydrogen ions liberated from the electrolyte during polarization at the contacting surfaces of said electrodes.

said hydrogenolysis of the halogenated hydrocarbon releasing free iodine, bromine, or chlorine in the electrolyte in exchange for the hydrogen ions to prevent the accumulation of gaseous hydrogen within the closed receptacle.

2. In a liquid level current control device of a type including a closed receptacle containing a modified halogen electrolyte and electrodes having a surface adapted to contact said electrolyte to provide a current conducting path in said electrolyte between said electrodes; the improvement wherein said electrolyte includes a liquid phase aliphatic hydrocarbon having at least one iodine, the aliphatic hydrocarbon being present in a minimum proportion of 1 gram per 100 milliliters of electrolyte to combine by hydrogenolysis with hydrogen ions liberated from the electrolyte during polarization at the contacting surfaces of said electrodes, said hydrogenolysis of the halogenated hydrocarbon releasing free iodine in the electrolyte and forming straight hydrocarbon to prevent the accumulation of gaseous hydrogen within the closed receptacle.

3. In a device according to claim 2 in which the halogenated aliphatic hydrocarbon comprises iodo-hexane.

4. In a device according to claim 2 in which the halogenated aliphatic hydrocarbon comprises iodo-octane.

5. In a device according to claim 2 in which the halogenerated aliphatic hydrocarbon comprises iodo-heptane.

6. In a device according to claim 2 in which the halogenated aliphatic hydrocarbon comprises tri-iodo-propane.

7. In a liquid level current control device of a type including a closed receptacle containing a modified halogen electrolyte and electrodes having a surface adapted to contact said electrolyte to provide a current conducting path in said electrolyte between said electrodes, the improvement wherein said electrolyte includes liquid phase halogenated aliphatic hydrocarbon consists of at least one bromine, the halogenated aliphatic hydrocarbon being present in a minimum proportion of 1 gram per 100 milliliters of electrolyte solution to combine by hydrogenolysis with hydrogen ions liberated from the electrolyte during polarization at the contacting surfaces of said electrodes, said hydrogenolysis of the halogenated hydrocarbon releasing free bromine in the electrolyte and forming straight hydrocarbon to prevent the accumulation of gaseous hydrogen within the closed receptacle.

8. In a liquid level current control device of a type including a closed receptacle containing a modified halogen electrolyte and electrodes having a surface adapted to contact said electrolyte to provide a current conducting path in said electrolyte between said electrodes; the improvement wherein said electrolyte includes a liquid phase halogenated alcohol having at least one bromine, the amount of halogenated alcohol being sufficient to combine by hydrogenolysis with a substantial percentage of the hydrogen ions liberated from the electrolyte during polarization at the contacting surfaces of said electrodes, said hydrogenolysis of the halogenated hydrocarbon releasing free bromine in the electrolyte in exchange for the hydrogen ions to prevent the accumulation of gaseous hydrogen within the closed receptacle.

9. In a liquid level current control device of a type including a closed receptacle containing a modified halogen electrolyte and electrodes having a surface adapted to contact said electrolyte to provide a current conducting path in said electrolyte between said electrodes; the improvement wherein said electrolyte includes halogenated alcohols having at least one iodine, the amount of halogenated alcohol being sufficient to combine by hydrogenolysis with a substantial percentage of the hydrogen ions liberated from the electrolyte during polarization at the contacting surfaces of said electrodes, said hydrogenolysis of the halogenated hydrocarbon releasing iodine in the electrolyte in exchange for the hydrogen ions to prevent the accumulation of gaseous hydrogen within the closed receptacle.

10. In a device of the type defined by claim 9 in which the halogenated alcohol comprises tetra-iodo-propanol and tetra-iodo-propanol iodide.

11. In a device of the type defined by claim 9 in which the halogenated alcohol comprises di-iodo-propanol.

12. In a liquid level current control device of a type including a closed receptacle, an electrolyte having substantially in the following proportions: 20 grams iodine in 65 cubic centimeters of propyl propionate and in 35 cubic centimeters of propanol and 4.5 grams sodium iodide, and electrodes having a surface adapted to contact said electrolyte to provide a current conducting path between said electrolyte and said electrodes; the improvement wherein said electrolyte includes in combination 5% tetra-iodo-propanol and tetra-iodo-propanol-iodide to combine by hydrogenolysis with free hydrogen released from the electrolyte during polarization at the contacting surface of the electrodes, said hydrogenolysis of the combination releasing free iodine in the electrolyte in exchange for the hydrogen to prevent the accumulation of gaseous hydrogen within the closed receptacle.

13. In a liquid level current control device of a type including a closed receptacle containing a modified halogen electrolyte and electrodes having a surface adapted to contact said electrolyte to provide a current conducting path in said electrolyte between said electrodes; the improvement wherein said electrolyte includes liquid phase halogenated esters having at least one bromine, the amount of halogenated esters being sufficient to combine by hydrogenolysis with a substantial percentage of the hydrogen ions liberated from the electrolyte during polarization at the contacting surfaces of said electrodes, said hydrogenolysis of the halogenated hydrocarbon releasing free bromine in the electrolyte in exchange for the hydrogen ions to prevent the accumulation of gaseous hydrogen within the closed receptacle.

14. In a liquid level current control device of a type including a closed receptacle containing a modified halogen electrolyte and electrodes having a surface adapted to contact said electrolyte to provide a current conducting path in said electrolyte between said electrodes; the improvement wherein said electrolyte includes liquid phase halogenated esters having at least one iodine, the amount of halogenated esters being sufficient to combine by hydrogenolysis with a substantial percentage of the hydrogen ions liberated from the electrolyte during polarization at the contacting surfaces of said electrodes, said hydrogenolysis of the halogenated hydrocarbon releasing free iodine in the electrolyte in exchange for the hydrogen ions to prevent the accumulation of gaseous hydrogen within the closed receptacle.

15. In a switch of the kind defined in claim 14, the halogenated ester comprising tetra-iodo-propyl-butyl ether.

16. In a liquid level current control device of a type including a closed receptacle containing an electrolyte of substantially 15% iodine in n-propanol as a carrier solvent and ¼ molar sodium iodide, and electrodes having a surface adapted to contact said electrolyte to provide a current conducting path between said electrodes in said electrolyte; the improvement wherein said electrolyte includes 4% by volume of di-tetra-iodo-propyl ether to combine by hydrogenolysis with free hydrogen liberated from the electrolyte during polarization at the contacting surfaces of said electrodes, said hydrogenolysis of the di-tetra-iodo-propyl ether releasing free iodine in the electrolyte in exchange for the hydrogen ions to prevent the accumulation of gaseous hydrogen within the closed receptacle.

17. In a liquid level current control device of the type including a closed receptacle, an electrolyte having substantially 15% iodine in n-propanol as a carrier solvent and ¼ molar sodium iodide, and electrodes having surfaces adapted to contact said electrolyte to provide a current conducting path between said electrolyte and electrodes; the improvement wherein said electrolyte includes 8% by volume of tetra-iodo-propyl-butyl-ether to combine by hydrogenolysis with free hydrogen from the electrolyte during polarization at the contacting surfaces of the electrodes, said hydrogenolysis of the ether releasing free iodine in exchange for the hydrogen to prevent accumulation of the free hydrogen within the closed receptacle.

18. In a liquid level current control device of a type including a closed receptacle containing a modified halogen electrolyte and electrodes having a surface adapted to contact said electrolyte to provide a current conducting path in said electrolyte between said electrodes; the improvement wherein said electrolyte includes liquid phase halogenated acyl having at least one member of a group consisting of iodine, bromine, and chlorine, the amount of halogenated acyl being sufficient to combine by hydrogenolysis with a substantial percentage of the hydrogen ions liberated from the electrolyte during polarization at the contacting surfaces of said electrodes, said hydrogenolysis of the halogenated acyl releasing free member of the group in the electrolyte in exchange for the hydrogen ions to prevent the accumulation of gaseous hydrogen within the closed receptacle.

19. In a liquid level switch of a type including a closed receptacle containing a liquid phase electrolyte and a gas phase bubble and adapted to pass an electric current through the electrolyte, the improvement comprising a liquid phase organic complex including a member of a group consisting of chlorine, bromine and iodine in said electrolyte and dissolvable therein, the organic compound being present in a minimum proportion of 1 gram per 100 milliliters of electrolyte solution to react with hydrogen ions forming in the switch at the electrodes by polarization to exchange the member of the group for said hydrogen ions and release free the member of the group which is soluable in the liquid phase.

References Cited by the Examiner

UNITED STATES PATENTS

| | | | |
|---|---|---|---|
| 2,387,313 | 10/1945 | Wilson | 338—44 X |
| 2,713,726 | 7/1955 | Dixson | 338—44 X |
| 2,764,653 | 9/1956 | Schoeppel et al. | 220—152.10 |
| 2,852,646 | 9/1958 | Broadley | 338—44 |
| 2,927,987 | 3/1960 | Uhl | 200—152.10 |

RICHARD M. WOOD, *Primary Examiner.*